Dec. 6, 1932.  L. R. OAKES  1,890,301
WEED EXTERMINATOR
Filed Oct. 24, 1931
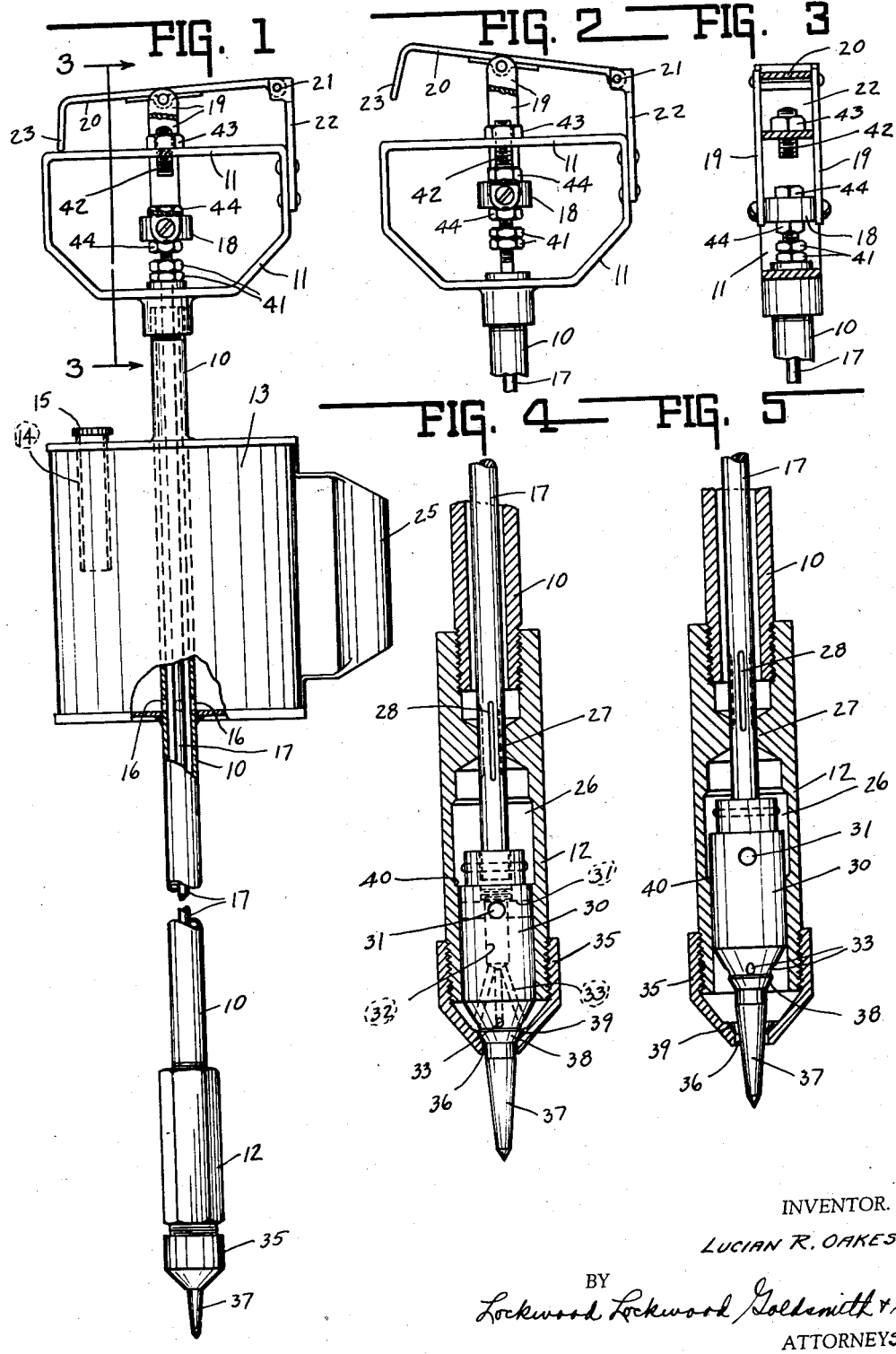
INVENTOR.
LUCIAN R. OAKES.
BY
Lockwood Lockwood Goldsmith & Galt
ATTORNEYS.

Patented Dec. 6, 1932

1,890,301

UNITED STATES PATENT OFFICE

LUCIAN R. OAKES, OF TIPTON, INDIANA

WEED EXTERMINATOR

Application filed October 24, 1931. Serial No. 570,779.

This invention relates to a hand machine for the individual extermination of dandelions and other plants and weeds which usually infest lawns. The device is adapted to penetrate or break the skin of the weed, preferably in the center of the weed, and to introduce into the hole or abrasion made in the weed a liquid, such as oil or other fluid, which will kill the weed.

The chief feature of the invention consists in a rod-like tool with its lower end adapted to penetrate or break into the body of the weed or plant, and means associated with said rod-like tool for discharging a weed-killing fluid, such as oil, in the hole or abrasion in the weed.

More particularly, the invention consists in a straight small tube with a handle on its upper end and a fluid or oil tank just below the handle adapted to discharge into said tube. A rod extends for the full length of the tube with its lower end pointed so as to adapt it to penetrate or break into the body of the weed or plant. Associated with the handle is a finger lever adapted to reciprocate said rod; and when the rod is withdrawn, it opens an outlet for the fluid at the lower end of the device and permits or forces the fluid to enter the hole or abrasion made in the weed by the point of the rod, and this fluid or oil follows down the lower point of the tool so as to be guided into the hole made in the plant.

The full nature of the invention will be understood from the accompanying drawing and the following description and claims:

In the drawing, Figure 1 is an elevation or view of the device in position for use, the same being partially broken away. Fig. 2 is a view like the upper part of Fig. 1 with the rod and lever elevated. Fig. 3 is a vertical section on the line 3—3 of Fig. 1 of the upper part of the device. Fig. 4 is a central vertical section of the lower portion of the device on a larger scale and with the parts in position for puncturing the weed or plant. Fig. 5 is the same with the parts in position after the weed or plant is punctured and during the discharge of the oil.

The complete invention is shown in Fig. 1. Its vertical length is about the same as a walking cane and the operator uses it in much the same manner, inserting the point at the lower end into the plant or weed and withdrawing it afterwards to the position shown in Fig. 5, during which the oil is discharged into the hole made in the weed, which kills the weed.

As seen in Fig. 1, there is an oil tube 10, substantially three feet long, with a handle 11 on the upper end of it and a cylinder 12 at the lower end of it and an oil can 13 below the handle through which the tube 10 extends. The oil can is charged through a tubular opening 14 that is closed by the removable cap 15. Oil ports 16 in the tube and near the bottom of the can 13 permit the oil to enter the tube from the can.

A rod 17 extends through tube 10 for its full length and at its upper end extends through the lower part of the handle 11. Its extreme upper end is threaded and has a collar 18 on it which carries a pair of vertical bars 19 that extend up beside and beyond the top bar of the handle 11 and then a finger lever 20 is centrally pivoted. Said lever is fulcrumed at 21 to a vertical bar 22 that is secured to one end of the handle 11 and the other end of the lever 20 has a downwardly turned stop 23 in position to engage the top of the handle 11 and limit the downward movement of the lever as shown in Fig. 1. The function of the handle 20 is to reciprocate the rod 17 as will hereafter be more fully explained.

The device is held for transportation by one hand of the operator through the handle 25 that is secured to one side of the oil can 13, while the device is operated by the other hand of the operator in connection with the handle 11 and lever 20.

The cylinder 12 is secured on the lower end of the oil tube 10 and has midway in it a small oil chamber 26. Above said oil chamber the cylinder 12 is constricted by a circular integral collar 27 which hugs the rod 17, but the oil is enabled to descend to the chamber 26 in cylinder 12 through grooves 28 extending longitudinally in the rod at the collar 27, as shown in Figs. 4 and 5.

The functions of the collar 27 are to guide the rod 17 and to force or expel outward the charge of oil in the chamber 26 when the plunger 30 is elevated from the position shown in Fig. 4 to that shown in Fig. 5. The plunger 30 is a head on the lower end of the rod 17 and it fits snugly in the lower end of the cylinder 12, when in its lower position, but, in its upper position, permits oil to pass from chamber 26 down through horizontal ports 31 in said plunger to a central passageway 32 shown by dotted lines in Fig. 4 and therefrom through a plurality of passageways 33 extending to the surface of the conical lower end of the plunger.

The lower end of the cylinder 12 has a screw cap 35 with its lower end conical and provided centrally with a discharge outlet 36 for the oil. The conical lower end of the plunger 30 has on its external end a tapering point 37, and has a tapering shoulder 38 adapted to seat on a tapering seat 39 when the shoulder is in its lower position as shown in Fig. 4. The upper end of the conical point, therefore, closes the outlet 36 when in the position shown in Fig. 4 and at that time the point projects downward about an inch from the cap 35 of the cylinder 12.

In operation, the device, is placed so that the point 37 will penetrate the weed. In the case of dandelions, dock and the like, it will penetrate the center of the body of the weed. That makes a hole an inch deep in the top of the body of the weed. Then the operator lifts the rod 17 and the point 37 at the lower end by elevating the lever 20 from the position shown in Fig. 1 to that shown in Fig. 2, and that removes the point 37 and plunger 30 from the position shown in Fig. 4 to that shown in Fig. 5. As soon as the ports 31 of the plunger rise above the annular shoulder 40, oil will be forced by the collar 27 of the cylinder through the ports 31, 32 and 33 and outlet 36. The oil will largely be guided in its downward movement by the retracted lower end of the point 37 shown in Fig. 5. At any rate, the oil will enter the hole or gash that has been made in the body of the plant or weed sufficiently to kill the plant. Oil is preferable, but any fluid which will kill the plant or weed will suffice.

The amount of oil discharged can be regulated by the nuts in the handle. Nuts 41 on the rod 17 limit the downward movement of said rod and the screw bolt 42 in the top of the handle 11 and nut 43 are adjustable to limit the upward limit of movement. The collar 18 is held in place on the rod by the nuts 44. It is obvious that by adjusting the stop bolt 42, the vertical movement of the lever 20 and the plunger 30 will be varied and thus vary the amount of fluid discharged from the chamber 26 at each operation.

The invention claimed is:

1. A weed exterminator consisting of a tube with a rigid handle on the upper end thereof, a fluid tank on the tube below the handle and communicating with the tube, a rod extending through the tube, a finger lever pivoted to one side of the handle and connected with the upper end of said rod whereby said rod can be reciprocated in said tube, a small cylinder secured to the lower end of the tube, a cap screwed on the lower end of said cylinder with a contracted outlet end, and a plunger in the lower end of said cylinder secured to said rod with a tapering point extending through said outlet opening and large enough to close the outlet opening when the point is in its lower position and to open said outlet opening when the point is withdrawn upward, whereby weed-killing fluid from said tank and tube in said cylinder may move down said tapered point into the weed as the point is being withdrawn therefrom.

2. A weed exterminator consisting of a tube with a rigid handle on the upper end thereof, a fluid tank on the tube below the handle and communicating with the tube, a rod extending through the tube, a finger lever pivoted to one side of the handle and linked in connection with the upper end of said rod whereby said rod can be reciprocated in said tube, a small cylinder secured to the lower end of the tube, a cap screwed on the lower end of said cylinder with a contracted outlet, a plunger in the lower end of said cylinder secured to said rod with a tapering point extending through said outlet and large enough to close the outlet when said point is in its lower position and to open said outlet when the point is withdrawn upward, said cylinder having a contracted portion near its upper end and said rod having a longitudinally prooved portion at the contracted portion of the cylinder so that when the plunger is elevated and said point withdrawn from the weed, the fluid will be forcibly expelled down out of said cylinder and around said point into the weed.

3. A weed exterminator consisting of a tube with a rigid handle on its upper end, a fluid tank on the tube below the handle and communicating with the tube, a rod-like member extending through the tube with a tapering lower end adapted to close the fluid outlet at the lower end of the tube when the tapering lower end is in its lower position and to open said outlet when said tapering lower end is drawn upward, a finger lever fulcrumed to one side of the handle and extending over the handle with a down turned free end adapted to rest on the handle so as to cooperate with the handle in forcing the tapering lower end into the weed, and a pivotal connection between the ends of said lever and said rod-like member whereby said member may be reciprocated by said lever.

4. A weed exterminator consisting of a tube with a handle on its upper end, a fluid tank in the tube below the handle and communicating with the tube, a rod-like member extending through the tube with a tapering lower end for controlling the outlet at the lower end of the tube, means on the handle for elevating the rod-like member, and adjustable stops associated with said handle for determining the upper and lower limits of movement of said rod-like member.

5. A weed exterminator consisting of a tube with a handle on its upper end, a fluid tank on the tube below the handle and communicating with the tube, a rod-like member extending through the tube with a tapering lower end for controlling the outlet at the lower end of the tube, means on the handle for elevating the rod-like member, a vertically adjustable collar on the upper part of said rod-like member within the handle, and stops on the rod-like member and handle adapted to limit tha range of the vertical movement of the rod-like member.

6. A weed exterminator consisting of a tube with a handle on the upper end thereof, a fluid tank on the tube below the handle and communicating with the tube, a rod extending through the tube, means associated with the handle for reciprocating said rod in said tube, a cylinder secured to the lower end of the tube and having a chamber therein adapted to receive charges of fluid from said tank and tube and having a collar therein, a plunger in said cylinder and chamber which is connected to the lower end of said rod and which plunger is provided below said collar with a passageway with an outlet at its lower end and with a tapering point below said outlet so that when the plunger is retracted upward its closed upper end will force the fluid in said chamber down through the plunger passageway and down along the tapering point during the withdrawal of said point.

7. A weed exterminator consisting of a tube with a handle on the upper end thereof, a fluid tank on the tube below the handle and communicating with the tube, a rod extending through the tube, means associated with the handle for reciprocating said rod in said tube, a cylinder secured to the lower end of the tube having a chamber therein adapted to receive charges of fluid from said tank and tube, a plunger in said cylinder and chamber which is connected to the lower end of said rod and which plunger is provided at its lower end with a tapering point and also with ports through it so that when it is retracted upward the fluid in said chamber will be forced through the plunger and down along the tapering point during the withdrawal of said point; and means for adjustably fixing the upward limit of movement of said rod and plunger whereby the amount of fluid in said charging chamber may be varied.

8. A weed exterminator consisting of a tube with a handle on its upper end, a fluid tank on said tube below the handle and communicating therewith, a rod-like member extending through said tube and provided with a tapering lower end, means on said handle for reciprocating said member, the lower end of the tube having an outlet hole through which the tapering lower end of the rod-like member extends so that said outlet will be closed by the tapering end of said member when in its lower position and open when withdrawn upwardly, and means associated with said tube and member for forcing the fluid under pressure through the outlet hole of the tube upon said member being withdrawn upwardly.

In witness whereof, I have hereunto affixed my signature.

LUCIAN R. OAKES.